(12) United States Patent
Okubo

(10) Patent No.: US 6,996,365 B2
(45) Date of Patent: Feb. 7, 2006

(54) SCORING METHOD AND SCORING SYSTEM

(75) Inventor: Hiroshi Okubo, Kyoto (JP)

(73) Assignee: Kabushiki Kaisha Nihon Toukei Jim Center, Kyoto (JP)

( * ) Notice: Subject to any disclaimer, the term of this patent is extended or adjusted under 35 U.S.C. 154(b) by 246 days.

(21) Appl. No.: 10/217,304

(22) Filed: Aug. 13, 2002

(65) Prior Publication Data

US 2003/0036047 A1  Feb. 20, 2003

(30) Foreign Application Priority Data

Aug. 15, 2001  (JP)  ............................. 2001-246762

(51) Int. Cl.
*G09B 11/00* (2006.01)

(52) U.S. Cl. .................................................... 434/353

(58) Field of Classification Search ................ 434/118, 434/167, 169, 160, 162, 322, 362, 353
See application file for complete search history.

(56) References Cited

U.S. PATENT DOCUMENTS

| | | | | |
|---|---|---|---|---|
| 3,284,929 A | * | 11/1966 | Azure, Jr. .................... | 434/358 |
| 3,594,927 A | * | 7/1971 | Koizumi ...................... | 434/350 |
| 4,337,051 A | * | 6/1982 | Donlon ........................ | 434/328 |
| 4,764,120 A | * | 8/1988 | Griffin et al. ............... | 434/336 |
| 5,211,564 A | * | 5/1993 | Martinez et al. ............. | 434/323 |
| 5,280,581 A | * | 1/1994 | Bathrick et al. ............. | 709/217 |
| 5,420,407 A | * | 5/1995 | Grundy, Jr. .................. | 235/454 |
| 5,672,060 A | * | 9/1997 | Poor ........................... | 434/322 |
| 5,724,357 A | * | 3/1998 | Derks ......................... | 434/351 |
| 5,991,595 A | * | 11/1999 | Romano et al. ............. | 434/353 |
| 6,000,945 A | * | 12/1999 | Sanchez-Lazer et al. ... | 434/322 |
| 6,112,049 A | * | 8/2000 | Sonnenfeld .................. | 434/350 |
| 6,173,154 B1 | * | 1/2001 | Kucinski et al. ............. | 434/359 |
| 6,296,489 B1 | * | 10/2001 | Blass et al. .................. | 434/185 |
| 6,311,040 B1 | * | 10/2001 | Kucinski et al. ............. | 434/350 |
| 2002/0001795 A1 | * | 1/2002 | Bejar et al. ................. | 434/350 |

FOREIGN PATENT DOCUMENTS

| | | |
|---|---|---|
| JP | 06-266281 | 9/1994 |
| JP | 07-121098 | 5/1995 |
| JP | 2000-122517 | 4/2000 |

\* cited by examiner

*Primary Examiner*—Xuan M. Thai
*Assistant Examiner*—Kathleen M. Christman
(74) *Attorney, Agent, or Firm*—Keating & Bennett, LLP

(57) ABSTRACT

A scoring method and a scoring system perform scoring quickly and accurately, and summarize and sort the scores into statistic data readily. The scoring method includes the steps of collecting answer data concerning answers provided by a plurality of examinees in a test, collecting various attribute data of the examinees, determining which answer data corresponds to a correct answer, an incorrect answer, and no answer, and summarizing the various attribute data of the examinees by contents of the answer data.

19 Claims, 10 Drawing Sheets

FIG. 4

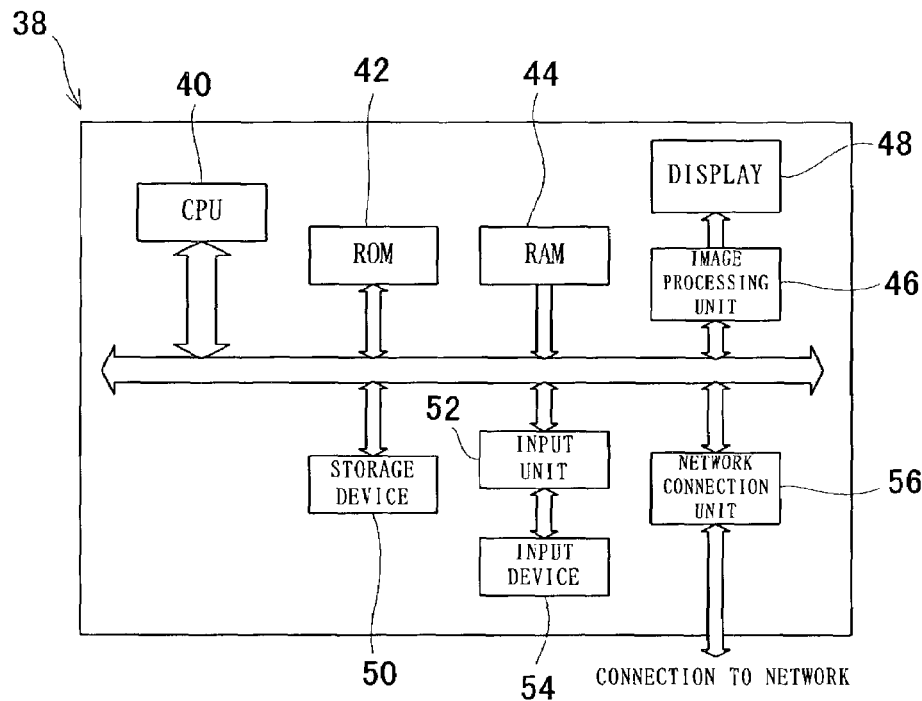

FIG. 5

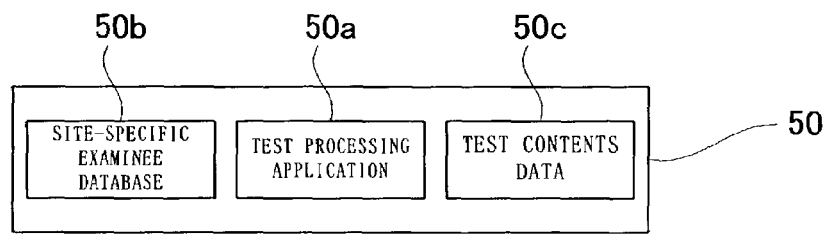

FIG. 6

| Admission Number | 80111 | 80114 |
|---|---|---|
| Admission Date | 20010402 | 20010404 |
| Name | Tanaka, Taro | Inoue, Hiroshi |
| Age | 24 | 32 |
| Gender | Male | Male |
| Address | Nakagyo-ku, Kyoto-shi | Shimogyo-ku, Kyoto-shi |
| Occupation | Businessperson | Businessperson |
| Job Description | Sales | Implementation Design |
| Membership of Institution | K Company | M Company |
| Examination Class | Class 6 | Class 2 |
| Examination Location | Kyoto | Kyoto |
| Method of Payment | Credit Card | Credit Card |
| Credit Card Company | V Company | V Company |
| Credit Card Number | 123456789012* | 323356784366* |
| Portrait Data | /usr/data/9342*** | /usr/data/9345*** |
| E-mail Address | taro@bde.co.jp | inoue@mmb.co.** |

FIG. 9

| Admission Number | 80111 | 80112 | 80113 | 80114 | . | . |
|---|---|---|---|---|---|---|
| Admission Date | 20010402 | 20010402 | 20010403 | 20010404 | . | . |
| Name | Tanaka, Taro | Sato, Shoko | Fujita, Miki | Inoue, Hiroshi | . | . |
| Age | 24 | 19 | 36 | 32 | . | . |
| Gender | Male | Female | Female | Male | . | . |
| Address | Nakagyo-ku, Kyoto-shi | Chuo-ku, Kobe-shi | Shibuya-ku, Tokyo-to | Shimogyo-ku, Kyoto-shi | . | . |
| Occupation | Businessperson | Student | Homemaker | Businessperson | . | . |
| Job Description | Sales | – | – | Implementation Design | . | . |
| Membership of Institution | K Company | A College | – | M Company | . | . |
| Examination Class | Class 6 | Class 2 | Class 2 | Class 2 | . | . |
| Examination Location | Kyoto | Kobe | Tokyo #2 | Kyoto | . | . |
| Method of Payment | Credit Card | Credit Card | Bank Transfer | Credit Card | . | . |
| Credit Card Company | V Company | J Company | – | V Company | . | . |
| Credit Card Number | 123456789012* | 43218765210* | – | 323356784366* | . | . |
| Portrait Data | /usr/data/934*** | /usr/data/934*** | /usr/data/934*** | /usr/data/934*** | . | . |
| E-mail Address | taro@bde.co.jp | shou@ncc.ne.jp | – | inoue@mmb.co.** | . | . |

70a

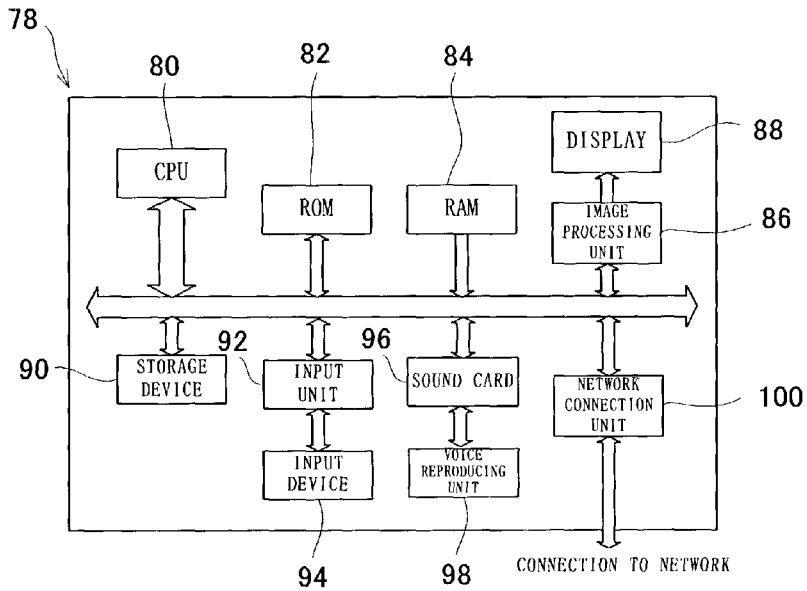

FIG. 10

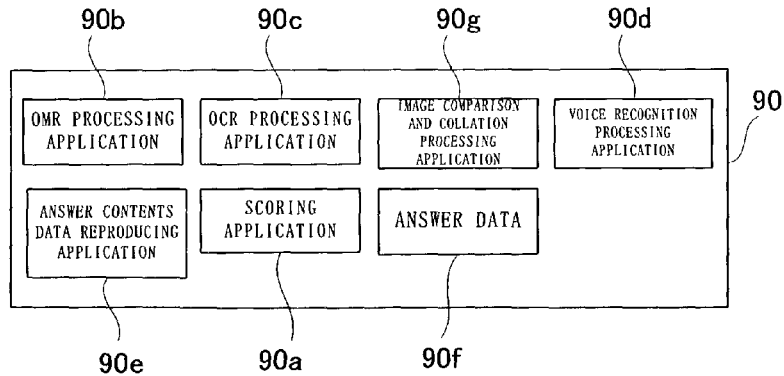

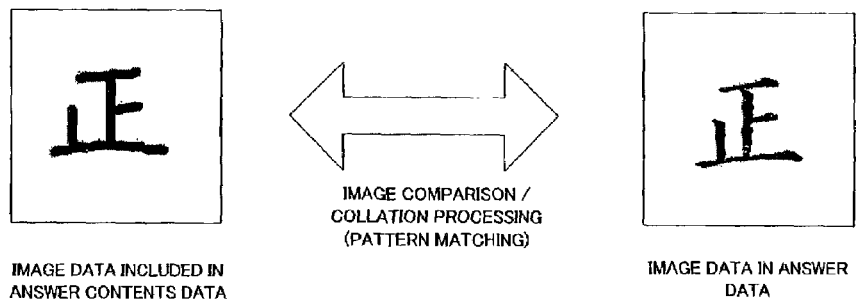

IMAGE DATA INCLUDED IN ANSWER CONTENTS DATA

IMAGE COMPARISON / COLLATION PROCESSING (PATTERN MATCHING)

IMAGE DATA IN ANSWER DATA

FIG. 13

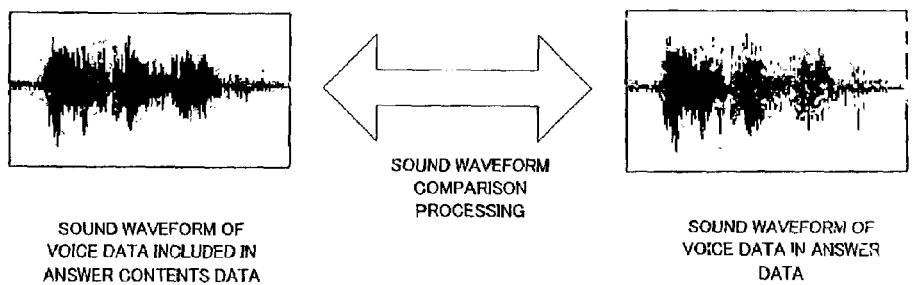

SOUND WAVEFORM OF VOICE DATA INCLUDED IN ANSWER CONTENTS DATA

SOUND WAVEFORM COMPARISON PROCESSING

SOUND WAVEFORM OF VOICE DATA IN ANSWER DATA

FIG. 14

| Question | Minimum Data Volume | Correct Answer 1 | Correct Answer 2 |
|---|---|---|---|
| Class 6, Question 1 | 0.7k | 留める | 留めておく |
| Class 6, Question 2 | 0.7k | 設ける | 設けた |
| Class 6, Question 3 | 0.7k | 断る | 断った |
| Class 6, Question 4 | 1k | 営んでいる | |
| Class 6, Question 5 | 0.5k | 断つ | |
| Class 6, Question 6 | 0.5k | 機繊 | |
| Class 6, Question 7 | 0.5k | 哀悼 | |
| Class 6, Question 8 | 0.5k | 把握 | |
| Class 6, Question 9 | 0.5k | 掌握 | |
| Class 6, Question 10 | 0.5k | 慰労 | |

THE JAPAN KANJI
APTITUDE TEST
EXAM QUESTIONS

THE JAPAN KANJI APTITUDE
TESTING FOUNDATION

CLASS 2

Do not answer with old form of kanji in common use, kanji excluded from the list, and readings excluded from the list of readings of kanji in common use.

ANSWER WITH TABLET

[VIII] In each of the following sentences, a wrongly used kanji having the same reading is included. Write the incorrect kanji in the upper box and the correct kanji in the lower box.
(Answer in Handwriting Field.)

SCORING METHOD AND SCORING SYSTEM

BACKGROUND OF THE INVENTION

1. Field of the Invention

The present invention relates to a scoring method and a scoring system. In particular, the present invention relates to a method and a system for processing scores which can summarize and sort the scores of answer-sheet tests, written tests, oral tests, and other tests into statistics quickly and accurately.

2. Description of the Prior Art

Conventionally, answers to answer-sheet tests, written tests, and oral tests have been scored by various methods as follows. For answer-sheet tests, OMR (Optical Mark Reader) processing has been performed for scoring. For written tests, markers have consulted model answers or the like to mark the answers written on the answer sheets. For oral tests, examiners have recorded evaluations concerning the verbal answers of examinees on check sheets or the like. The scores have been summarized and sorted by hand to create statistic data, which has been used as reference data for future test writing, educational guidance, and so on.

The conventional method, however, has inefficiently consumed a considerable amount of time in evaluating a number of examinees. Besides, written tests and oral tests have been evaluated by the markers and others consulting model answers and check sheets, in which case marker-by-marker variations in scoring criteria have led to scores that are unfair to examinees.

In addition, summarizing and sorting the scores into statistic data has required that the examinees' attribute data such as ages, genders, and occupations be input to a database by hand, in addition to the score data. This operation is extremely inefficient and is very expensive. Consequently, statistic data obtainable from the scores has not been created so often, being rarely utilized as the reference data for future test writing, educational guidance, and so on.

SUMMARY OF THE INVENTION

In order to solve the problems described above, preferred embodiments of the present invention provide a scoring method and a scoring system which perform scoring quickly and accurately, and summarize and sort the scores into statistic data readily.

According to a first preferred embodiment of the present invention, a scoring method includes the steps of collecting answer data concerning answers provided by a plurality of examinees in a test, collecting various attribute data of the examinees, determining which of the answer data corresponds to one of a correct answer, an incorrect answer, and no answer, and summarizing the various attribute data of the examinees based on the contents of the answer data.

In the step of determining which of the answer data corresponds to a correct answer, an incorrect answer, and a no answer preferably includes the step of determining, with respect to each question, that answer data provided has a data volume that is smaller than that of minimum answer data to be generated for a correct or incorrect answer, indicating that no answer was provided.

The various attribute data of the examinees may preferably include at least one of age, gender, an occupation, an address, and membership of institutions.

Also, the answer data is preferably character data in one preferred embodiment of the present invention.

In a further preferred embodiment, the answer data is preferably image data, and is subjected to image recognition processing for scoring.

In another preferred embodiment, the answer data is image data, and for scoring, the image data is compared and collated with image data to be drawn under a correct answer.

In a further preferred embodiment, the answer data is voice data, and a sound waveform appearing when the voice data is reproduced is subjected to comparison for scoring.

It is preferred that the examinees provide answers by using computers, and the answer data is answer contents data created by the computers.

Also, it is preferred that the image data includes information relating to a process for an answerer to provide an answer.

In one preferred embodiment, it is preferred that the information relating to a process for an answerer to provide an answer is the order of strokes in writing a character or symbol.

In another preferred embodiment, the information relating to a process for an answerer to provide an answer is tool pressure in writing a character or symbol.

According to another preferred embodiment of the present invention, a scoring system includes an answer data collecting unit for collecting answer data relating to answers provided by a plurality of examinees of a test, an attribute data collecting unit for collecting various attribute data of the examinees, an answer determination unit for determining which the answer data corresponds to one a correct answer, an incorrect answer, and no answer, and a summarizing and sorting unit for summarizing and sorting the various attribute data of the examinees based on the contents of the answer data.

The answer determination unit determines, with respect to each question, that answer data provided has a data volume that is smaller than that of minimum answer data to be generated for a correct or incorrect answer, which indicates that no answer was provided.

In the scoring system, it is preferred that the various attribute data of the examinees includes at least one of age, gender, an occupation, an address, and membership of institutions.

In one preferred embodiment of the scoring system, it is preferred that the answer data is character data.

In another preferred of the scoring system, the answer data is image data, and is subjected to image recognition processing for scoring.

Also it is preferred that the answer data is image data, and for scoring, the image data is compared and collated with image data to be drawn under a correct answer.

In another preferred embodiment of the scoring system, it is preferred that the answer data is voice data, and a sound waveform appearing when the voice data is reproduced is subjected to comparison for scoring.

In a preferred embodiment of the scoring system it is preferred that the examinees provide answers by using computers, and the answer data is answer contents data created by the computers.

In a further preferred embodiment of the scoring system, it is preferred that the image data includes information relating to a process for an answerer to provide an answer.

The information relating to a process for an answerer to provide an answer is preferably the order of strokes in writing a character or symbol or is tool pressure in writing a character or symbol.

The foregoing and other elements, characteristics, features, and advantages of the present invention will become

BRIEF DESCRIPTION OF THE DRAWINGS

FIG. 4 is a block diagram showing an examination site server;

FIG. 5 is a schematic diagram showing various applications and other information stored in a storage device;

FIG. 6 is a schematic diagram showing the contents of a site-specific examinee database;

FIG. 9 is a schematic diagram showing the contents of an examinee database;

FIG. 10 is a block diagram showing a scoring server;

FIG. 11 is a schematic diagram showing various applications and other information stored in a storage device;

FIG. 12 is a conceptual diagram showing image comparison and collation processing;

FIG. 13 is a conceptual diagram showing sound waveform comparison processing;

FIG. 14 is a schematic diagram showing answer data;

FIG. 17 is another schematic diagram showing how answers are made;

FIG. 18(a) is a diagram showing an image after a first tablet input, FIG. 18(b) a diagram showing the image after a second input, FIG. 18(c) a diagram showing the image after a third input, FIG. 18(d) a diagram showing the image after a fourth input, and FIG. 18(e) a diagram showing the image after a fifth input;

FIG. 19(a) is a diagram showing a first element drawn with a tablet, FIG. 19(b) a diagram showing a second element, FIG. 19(c) a diagram showing a third element, FIG. 19(d) a diagram showing a fourth element, and FIG. 19(e) a diagram showing a fifth element; and FIG. 20 is a schematic diagram showing a no-answer database.

DETAILED DESCRIPTION OF PREFERRED EMBODIMENTS

Figure 1:
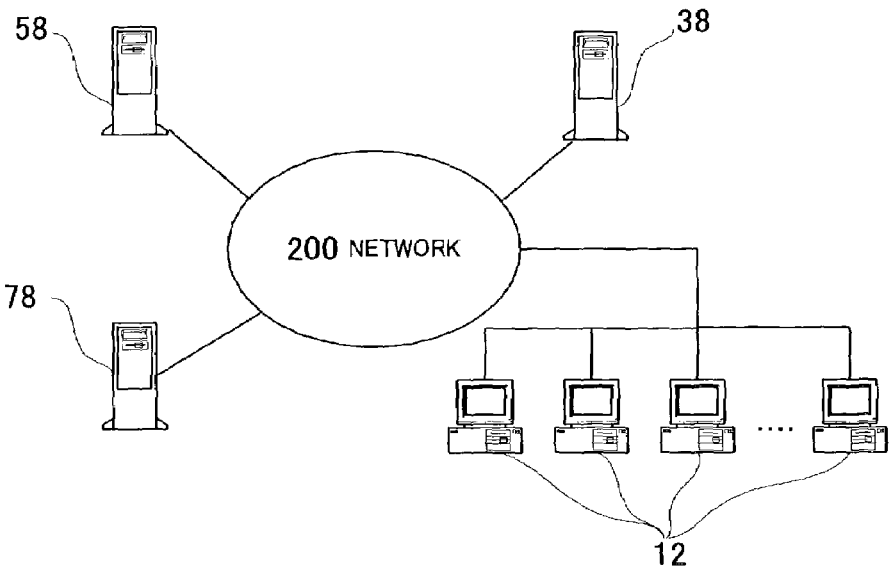
FIG. 1 is a schematic diagram showing a preferred embodiment of the scoring system according to the present invention.

FIG. 1 is a schematic diagram showing a preferred embodiment of the scoring system according to the present invention. Referring to FIGS. 1 through 14, description will hereinafter be given of the hardware configuration of an online examination system 10.

As shown in FIG. 1, the online examination system 10 includes examination terminals 12, an examination site server 38, a test management server 58, and a scoring server 78.

Figure 2:
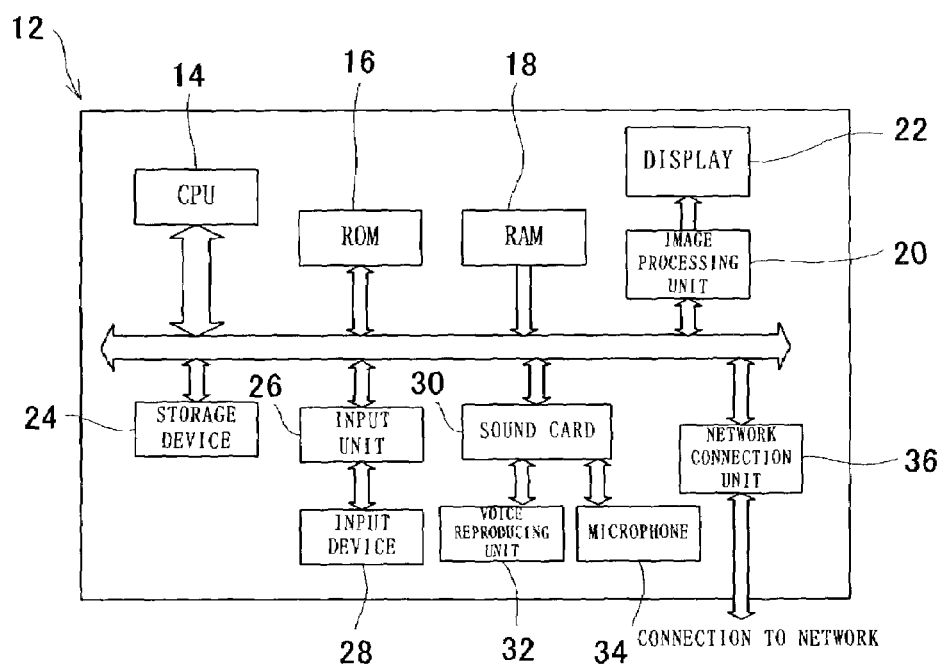
FIG. 2 is a block diagram showing an examination terminal.

The examination terminals 12 are terminals by which examinees view and listen to test contents data and create answer contents data. As shown in FIG. 2, each examination terminal 12 preferably includes a CPU 14. The CPU 14 is a central processing unit for carrying out operations when the examination terminal 12 performs various types of processing. The CPU 14 is connected with a ROM 16. The ROM 16 is a memory for storing basic input/output processing programs for the examination terminal 12 to execute upon activation. The CPU 14 is also connected with a RAM 18. The RAM 18 is a memory for temporarily storing programs and data in use when the CPU 14 performs various operations.

The CPU 14 is connected with an image processing unit 20. The image processing unit 20 generates screen display data based on the results of operations by the CPU 14. The image processing unit 20 is connected with a display 22. The display 22 displays test contents data on-screen based on the screen display data generated by the image processing unit 20.

Figure 3:
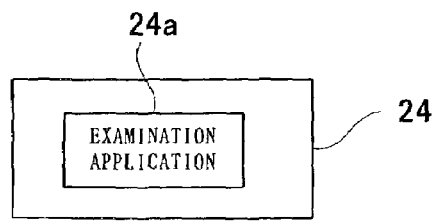
FIG. 3 is a schematic diagram showing an examination application stored in a storage device.

The CPU 14 is connected with a storage device 24. The storage device 24 stores programs and data to be used when the CPU 14 performs various operations. The storage device 24 also stores data that is generated through the operations of the CPU 14. As shown in FIG. 3, the applications stored in the storing device 24 include an examination application 24a as well as an OS (operating system), which is not shown in the Figure. The examination application 24a generates on the display 22, text data, still image data, and moving image data included in the test contents data which is distributed from the examination site server 38 to be described later. The examination application 24a also reproduces voice from voice data and moving image data included in the test contents data, by using a voice reproducing unit 32 to be described later. In addition, the examination application 24a generates answer contents data based on answers that are input by the examinee from an input device 28 to be described later. The answer contents data generated are stored into the storage device 24.

The CPU 14 is connected with an input unit 26. The input unit 26 is an interface for establishing connection with an input device 28 to be described later. The input unit 26 inputs to the CPU 14 various types of instruction signals and various types of data input from the input device 28. The input unit 26 is connected with the input device 28. The input device 28 may be a keyboard, a mouse, a tablet with tool force sensing function, and/or a touch panel. The input device 28 is intended to input instruction signals and input answers to the tests conducted on the examination terminal 12.

The CPU 14 is connected with a sound card 30. The sound card 30 incorporates various sound source chips etc., and provides a function of reproducing/recording voice at the examination terminal 12. The sound card 30 is connected with the voice reproducing unit 32. The voice reproducing unit 32 may be a loudspeaker or headphones. The voice reproducing unit 32 reproduces voice signals such as test questions supplied from the sound card 30. The sound card 30 is connected with a microphone 34. The microphone 34 is intended to collect voice pronounced by the examinee when test answers are supposed to be provided in the form of voice or moving images with voice.

The CPU 14 is connected with a network connection unit 36. The network connection unit 36 uses a LAN card, modem, terminal adopter, or other suitable device, and is connected to a network 200.

Incidentally, the number of examination terminals 12 is as many as appropriate for the number of examinees. Test contents data corresponding to the tests for the examinees to take are distributed to the respective examination terminals 12 as needed. These examination terminals 12 can be configured to be the same by installing the examination application 24a on personal computers or workstations.

The examination site server 38 distributes test contents data to the examination terminals 12 connected to the network 200. The examination site server 38 also collects the answer contents data created by the examination terminals 12 and sends this data to the scoring server 78. As shown in FIG. 4, the examination site server 38 has a CPU 40. The CPU 40 is a central processing unit for carrying out operations when the examination site server 38 performs various types of processing. The CPU 40 is connected with a ROM 42. The ROM 42 is a memory for storing basic input/output processing programs for the examination site server 38 to execute upon activation. The CPU 40 is also connected with a RAM 44. The RAM 44 is a memory for temporarily storing programs and data in use when the CPU 40 performs various operations.

The CPU 44 is connected with an image processing unit 46. The image processing unit 46 generates screen display data based on the results of operations by the CPU 44. The image processing unit 46 is connected with a display 48. The display 48 makes on-screen display based on the screen display data generated by the image processing unit 46. Incidentally, the display 48 need not be connected if the examination site server 38 requires no processing monitoring.

The CPU 40 is connected with a storage device 50. The storage device 50 stores programs and data to be used when the CPU 40 performs various operations. The storage device 50 also stores data that is generated through the operations of the CPU 40. As shown in FIG. 5, the applications stored in the storage device 50 include a test processing application 50a, a site-specific examinee database 50b, and test contents data 50c as well as an operating system OS, which is not shown.

The test processing application 50a authenticates examinees based on such information as admission numbers included on admission cards, which are input by the examinees via the examination terminals 12. The test processing application 50a also acquires the test contents data 50c, which is data extracted by types of tests from a test contents database 66b stored on the test management server 58. In addition, the test processing application 50a distributes the test contents data 50c of the tests for the examinees to take to the respective examination terminals 12 based on the contents of authentication. The test processing application 50a also collects the answer contents data from the examination terminals 12 upon the expiration of the test time, and sends the same to the scoring server 78.

As shown in FIG. 6, the site-specific examinee database 50b includes information which the test processing application 50a has extracted, by examination site, from an examinee database 66a stored on the test management sever 58 to be described later. The information preferably includes personal information and personal attribute data of examinees, information for identifying the tests for the examinees to take, and the methods of payment of examination fees, such as admission numbers, admission dates, names, ages, genders, addresses, occupations, job descriptions, membership of institutions, examination classes, examination locations, the methods of payment, credit card companies, credit card numbers, portrait data, and e-mail addresses. The information in the site-specific examinee database 50b is consulted when the test processing application 50a authenticates examinees.

The test contents data 50c are data which the test processing application 50a has extracted, by types of tests, from the test contents database 66b stored on the test management server 58 to be described later. According to the types of tests to be conducted at the examination site, test contents data 50c of corresponding contents may be distributed from a plurality of test management servers 58. The test contents data 50c include text data containing characters and symbols that describe questions, voice data containing voice of examiners reading questions, and moving image data made of video signals.

The CPU 40 is connected with an input unit 52. The input unit 52 is an interface for establishing connection with an input device 54 to be described later. The input unit 52 inputs to the CPU 40 various types of instruction signals and various types of data input from the input device 54. The input unit 52 is connected with the input device 54. The input device 54 may be a keyboard, a mouse, and/or other suitable devices. Incidentally, the input device 54 need not be connected to the input unit 52 if the examination site server 38 performs none of the data input processes.

The CPU 40 is connected with a network connection unit 56. The network connection unit 56 uses a modem, terminal adopter, LAN card, or other suitable device, and is connected to the network 200.

Incidentally, the examination site server 38 is installed on each examination site. These examination site servers 38 can be configured to be the same by installing the test processing application 50a on workstations or servers.

Figure 7:
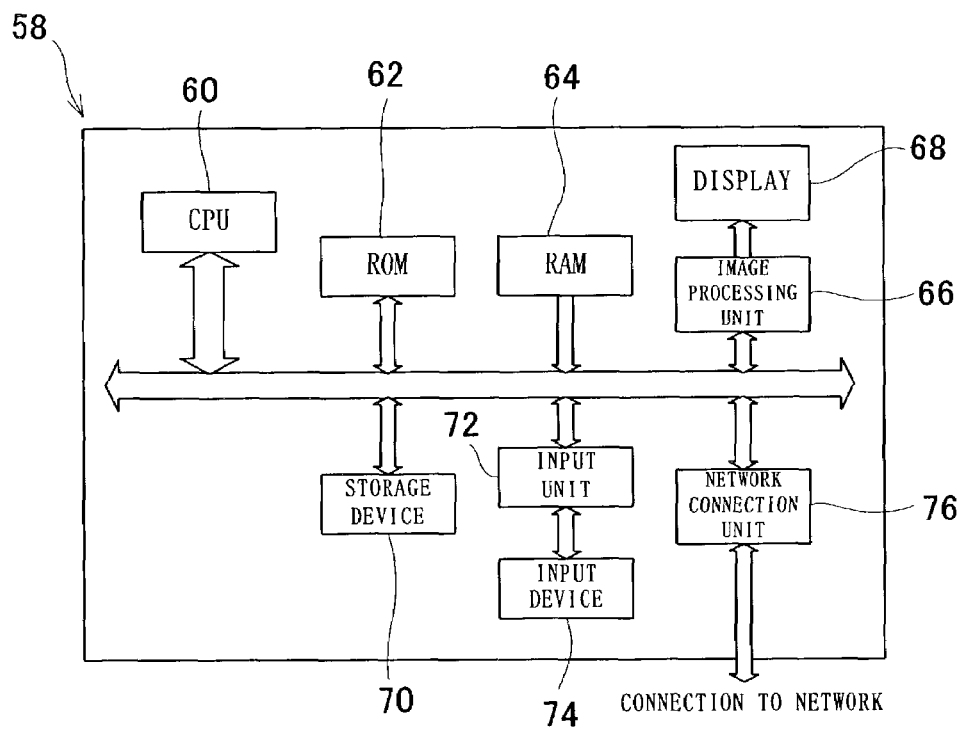
FIG. 7 is a block diagram showing a test management server.

The test management server 58 distributes the test contents data 50c to the examination site server(s) 38 connected to the network 200, and provides the examination terminals 12 with scoring contents data created by the scoring server 78 as miscellaneous data. As shown in FIG. 7, the test management server 58 has a CPU 60. The CPU 60 is a central processing unit for carrying out operations when the test management server 58 performs various types of processing. The CPU 60 is connected with a ROM 62. The ROM 62 is a memory for storing basic input/output processing programs for the test management server 58 to execute upon activation. The CPU 60 is also connected with a RAM 64. The RAM 64 is a memory for temporarily storing programs and data in use when the CPU 60 performs various operations.

The CPU 60 is connected with an image processing unit 66. The image processing unit 66 generates screen display data based on the results of operations by the CPU 60. The image processing unit 66 is connected with a display 68. The display 68 generates on-screen displays based on the screen display data generated by the image processing unit 66. Incidentally, the display 68 need not be connected if the test management server 58 requires no processing monitoring.

Figure 8:
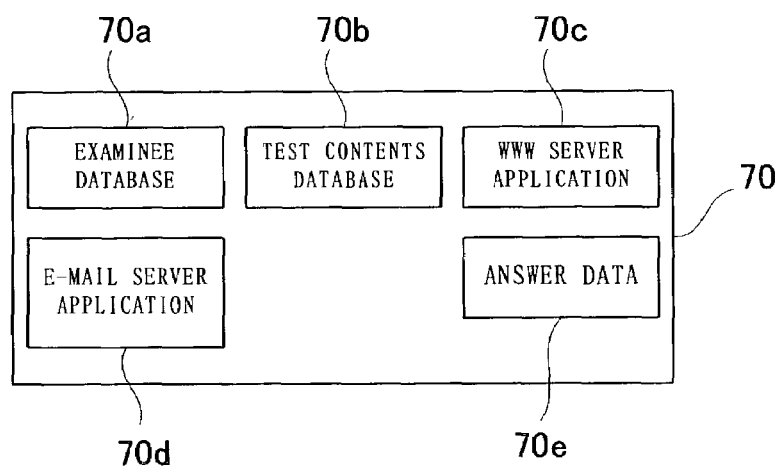
FIG. 8 is a schematic diagram showing various applications and other information stored in a storage device.

The CPU 60 is connected with a storage device 70. The storage device 70 stores programs and data to be used when the CPU 60 performs various operations. The storage device 70 also stores data that is generated through the operations of the CPU 60. As shown in FIG. 8, the applications stored in the storage device 56 preferably include an examinee database 70a, a test contents database 70b, a WWW server application 70c, an e-mail server application 70d, and answer data 70e as well as an operating system OS, not shown.

As shown in FIG. 9, the examinee database 70a includes personal information and personal attribute data of examinees, information for identifying the tests for the examinees to take, and the methods of payment of examination fees, such as admission numbers, admission dates, names, ages, genders, addresses, occupations, job descriptions, membership of institutions, examination classes, examination locations, the methods of payment, credit card companies, credit card numbers, portrait data, and e-mail addresses. The examinee database 70a is entered by test administrators with reference to examination application forms filled-in, or by the examinees themselves through such means as the WWW server application 70c.

The test contents database 70b includes a plurality of sets of test contents data 50c. The test contents database 70b extracts test contents data 50c to be distributed to the examination site server(s) 38 out of the test contents data 50c stored, in response to requests from the test processing application(s) 50a.

The WWW server application 70c is intended to release test results over the Internet by using the scoring contents data created by the scoring server 78. The WWW server application 70c also applies the examinee database 70a to CGI (common gateway interface) applications to provide an interface for examination procedures.

The e-mail server application 70d is intended to send e-mails for notifying the examinees of the test results directly by using the scoring contents data created by the scoring server 78. Incidentally, the e-mail addresses of the examinees are extracted from the examinee database 70a as needed.

The answer data 70e is data that shows the answers corresponding to the test contents data 50c. The answer data 70e includes data for use in OMR processing, OCR processing, image comparison and collation processing, and voice recognition processing. The answer data 70e is distributed to the scoring server 78 as needed.

The CPU 60 is connected with an input unit 72. The input unit 72 is an interface for establishing connection with an input device 74 to be described later. The input unit 72 inputs to the CPU 60 various types of instruction signals and various types of data input from the input device 74. The input unit 72 is connected with the input device 74. The input device 74 may be a keyboard, a mouse, and/or other suitable device.

The CPU 60 is connected with a network connection unit 76. The network connection unit 76 uses a modem, terminal adopter, LAN card, or other suitable device, and is connected to the network 200.

The scoring server 78 collects answer contents data from the examination site server(s) 38 connected to the network 200, performs scoring, and creates scoring contents data. As shown in FIG. 10, the scoring server 78 has a CPU 80. The CPU 80 is a central processing unit for carrying out operations when the scoring server 78 performs various types of processing. The CPU 80 is connected with a ROM 82. The ROM 82 is a memory for storing basic input/output processing programs for the scoring server 78 to execute upon activation. The CPU 80 is also connected with a RAM 84. The RAM 84 is a memory for temporarily storing programs and data in use when the CPU 80 performs various operations.

The CPU 80 is connected with an image processing unit 86. The image processing unit 86 generates screen display data based on the results of operations by the CPU 80. The image processing unit 86 is connected with a display 88. The display 88 generates an on-screen display based on the screen display data generated by the image processing unit 86.

The CPU 80 is connected with a storage device 90. The storage device 90 stores programs and data to be used when the CPU 80 performs various operations. Specifically, as shown in FIG. 11, the storage device 90 includes a scoring application 90a, an OMR processing application 90b, an OCR processing application 90c, an image comparison and collation processing application 90g, a voice recognition processing application 90d, an answer contents data reproducing application 90e, and answer data 90f as well as an Operating System, which is not shown.

The scoring application 90a collates the collected answer contents data with the answer data 90f for answer scoring, and creates scoring contents data. Before scoring, the scoring application 90a determines if answers to individual questions are correct/incorrect or absent based on the volumes of data for the respective answers, i.e., character data, image data, and/or voice data. When the data, or the answer to each question, exceeds the volume of data to be generated for a correct or incorrect answer, it is passed to the OMR processing application 90b, the OCR processing application 90c, the image comparison and collation processing application 90g, the voice recognition application 90d, or the answer contents data reproducing application 90e. The data is thereby converted into character data or sound waveform data scorable by the scoring application 90a, and then the scoring is performed to create the scoring contents data. Here, the scoring contents data is created as data that is capable of being distributed by WWW servers/e-mails and as data capable of being input to databases.

The OMR processing application 90b applies OMR (Optical Mark Reader) processing to image data included in the answer contents data, thereby converting the image data into character data which can be scored by the scoring application 90a. The data generated in the form of character data is used by the scoring application 90a for scoring. The answer contents data to be processed by the OMR processing application 90b is image data that stores markings drawn as answers on the examination terminals 12.

The OCR processing application 90c applies OCR (Optical Character Reader) processing to image data included in the answer contents data, thereby converting the image data into character data which can be scored by the scoring application 90a. The data generated in the form of character data is used by the scoring application 90a for scoring. The answer contents data to be processed by the OCR processing application 90c is image data that stores characters and symbols drawn as answers on the examination terminals 12.

The image comparison and collation processing application 90g, as shown in FIG. 12, performs pattern matching between image data included in the answer contents data and image data that is stored as answer data. This makes a conversion into character data which can be scored by the scoring application 90a. The data generated in the form of character data is used by the scoring application 90a for scoring. The answer contents data to be processed by the image comparison and collation processing application 90g are preferably image data that stores characters and symbols drawn as answers on the examination terminals 12.

The voice recognition processing application 90d, as shown in FIG. 13, performs a sound waveform comparison between voice data included in the answer contents data and voice data that is stored as answer data. This makes a conversion into character data which can be scored by the scoring application 90*a*. The answer contents data to be processed by the voice recognition processing application 90*d* are voice data that stores answers pronounced into the examination terminals 12.

The answer contents data reproducing application 90*e* is an application by which markers view the answer data for questions that are impossible for the scoring application 90*a* to score on the basis of the character data converted by the OMR processing application 90*b*, the OCR processing application 90*c*, the image comparison and collation processing application 90*g*, and the voice recognition processing application 90*d*. The answer contents data reproducing application 90*e* has the function of showing and reproducing all the types of data included in the answer contents data.

The answer data 90*f*, as shown in FIG. 14, includes the correct answer data concerning individual questions and the minimum volumes of answer data to be generated for correct or incorrect answers, or minimum data volumes.

The CPU 80 is connected with an input unit 92. The input unit 92 is an interface for establishing connection with an input device 94 to be described later. The input unit 92 inputs to the CPU 80 various types of instruction signals and various types of data input from the input device 94. The input unit 92 is connected with the input device 94. The input device 94 may be a keyboard, a mouse, and/or other suitable device.

The CPU 80 is connected with a sound card 96. The sound card 96 incorporates various sound source chips etc., and provides a function of reproducing/recording voice on the scoring server 78. The sound card 96 is connected with the voice reproducing unit 98. The voice reproducing unit 98 may be a loudspeaker or headphones. The voice reproducing unit 98 reproduces voice data included in the answer contents data supplied from the sound card 96.

The CPU 80 is connected with a network connection unit 100. The network connection unit 100 preferably uses a modem, terminal adopter, LAN card, or other suitable device, and is connected to the network 200.

Figure 15:
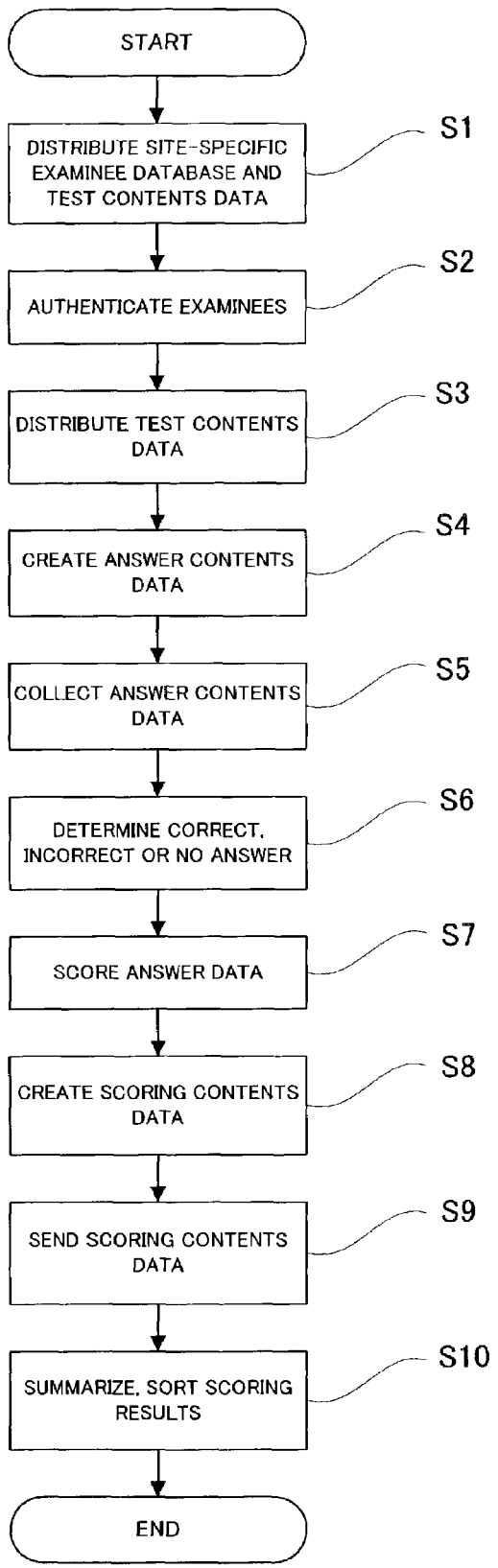
FIG. 15 is a flowchart showing the operation of an online examination system.

Hereinafter, description will be given of the operation of the online examination system 10. FIG. 15 is a flowchart showing the operation of the online examination system.

Initially, a site-specific examinee database 50*b* and test contents data 50*c* are distributed from the test management server 58 to the examination site server 38 over the network 200 (step S1). Here, the site-specific examinee database 50*b* and the test contents data 50*c* are distributed either manually or automatically.

Next, examinees enter the admission numbers seen on their admission cards from the examination terminals 12. The test processing application 50*a* on the examination site server 38 collates the admission numbers with the site-specific examinee database 50*b* to authenticate the examinees (step S2). If the examinees are authenticated, the tests for the examinees to take are identified with reference to the site-specific examinee database 50*b*.

After the authentication, test contents data 50*c* corresponding to the tests for the examinees to take are distributed to the respective examination terminals 12 (step S3).

The test contents data 50*c* are received by the examination terminals 12, in which the contents of the test contents data 50*c* are displayed on-screen, reproduced in voice form, or reproduced as moving images by the examination applications 24*a*. The examinees input to the examination applications 24*a* the answers to the contents displayed on-screen, reproduced in voice form, or reproduced as moving images, thereby creating answer contents data (step S4).

Figure 16:
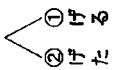
FIG. 16 is a schematic diagram showing how answers are made.
Figure 18A:
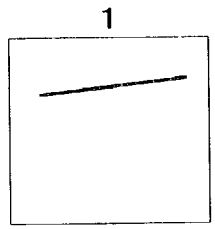
FIGS. 18(a)–18(e) are schematic diagrams showing image data; more particularly.
Figure 18B:
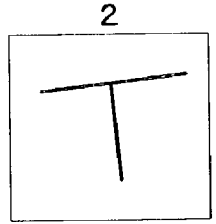
Figure 18C:
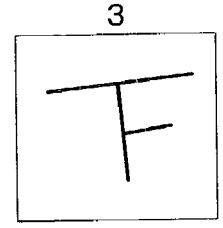
Figure 18D:
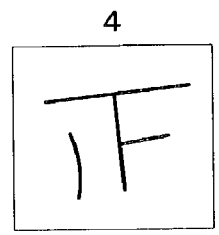
Figure 18E:
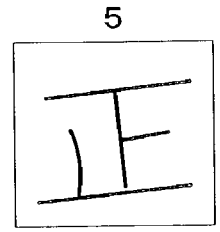
Figure 19A:
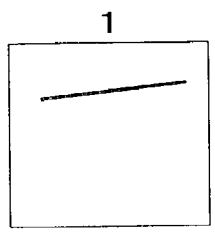
FIGS. 19(a)–19(e) are schematic diagrams showing image data; more particularly.
Figure 19B:
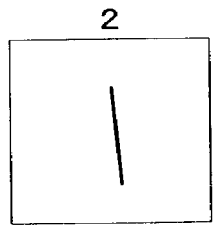
Figure 19C:
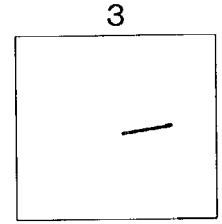
Figure 19D:
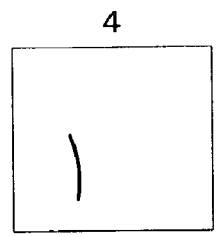
Figure 19E:
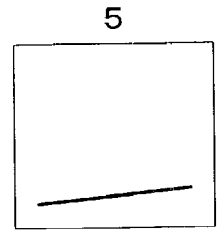

For answer-sheet type or alternative type tests, the answer contents data, or image data, is created by selecting and inputting characters and/or symbols displayed on the display 22 as shown in FIG. 16, using the input devices 28. The present preferred embodiment deals with the case where the answer contents data are created as image data even in the cases of answer-sheet type or alternative type tests. Otherwise, character data may be entered from keyboards or other suitable input devices of the examination terminals 12.

For written tests and such tests that ask the order of strokes or the manner in which a calligraphic character is written, the answer contents data, or image data capable of OCR processing or image comparison/collation processing, is created for each question by inputting a character, a symbol, or a drawing into a handwriting field appearing on the display 22 as shown in FIG. 17, using such an input device 28 as a tablet with tool force sensing function. The image data may use general purpose image formats such as tiff, gif, jpeg, bmp, png, and wmf, as well as an original image format. For questions concerning character strokes and problems for construction in which the order of strokes (the sequence in which a character or a drawing is written) is in question, image data is recorded more than that storing the image of the completed character or drawing alone. For example, as shown in FIGS. 18(*a*) through 18(*e*), a plurality of pieces of image data in the course of writing are recorded so that the process of inputting of a character or drawing can be recognized. As shown in FIGS. 19(*a*) through 19(*e*), elements drawn to input a character or drawing may be numerically recorded as vector image data. In addition, data for showing histories of tool pressure in the process of input of a character or drawing, along with the order of strokes, may also be generated and recorded with the image data.

For oral tests, the answer contents data, or voice data, is created by the examinees making verbal answers and inputting the voice into the microphones 34. The voice data may use general purpose formats such as mp3, avi, and wav, as well as an original voice format.

Incidentally, the answer contents data do not necessarily have to be a single type of data such as text data, image data, and voice data. These types of data may be used in combination.

At the expiration of the test time, the examination site server 38 collects the answer contents data from the individual examination terminals 12. The answer contents data collected to the examination site server 38 is delivered from the examination site server 38 to the scoring server 78, along with the examinees' personal information and attribute data stored in the site-specific examinee database 50*b* (step S5).

Next, the scoring server 78 determines if the answers to the individual questions are correct/incorrect or absent, based on the volumes of data of the answers, i.e., the character data, image data, and/or voice data (step S6). The determinations are made depending on the minimum data volumes of the respective questions which are included in the answer data 90*f*. If the answers to the questions, or the character data, image data, and/or voice data, exceed the respective minimum data volumes, they are determined as correct or incorrect answers. Answers below the minimum data volumes are determined to be absent.

Figure 20:
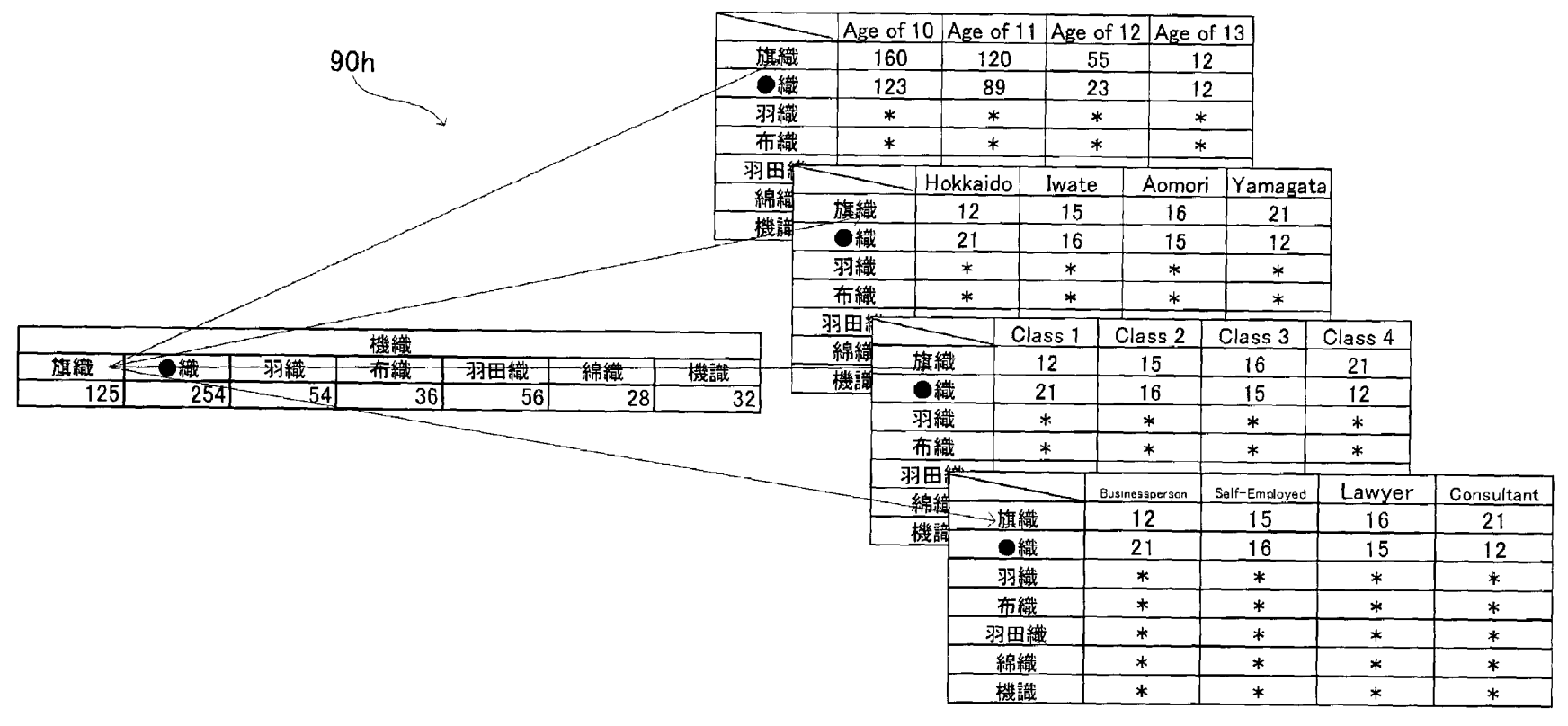

Concerning those answers determined to be absent, a no-answer database 90*h* shown in FIG. 20 is created/updated to register the numbers of examinees having made no answer to the answer-absent questions. Moreover, the numbers are summarized by attribute such as age, address, occupation, and examination class and by attribute data such as gender, job description, membership of institutions, and examination location. Consequently, the contents of the no-answer database 90h can be consulted by test writers for the sake of appropriate test writing in the future.

At step S7, the data determined as correct or incorrect answers at step S6 is subjected to scoring. The scoring is performed by the scoring application 90a in accordance with the types of data included in the answer contents data.

When the answer contents data includes image data for OMR, the OMR processing application 90b performs data conversion, and the scoring application 90a collates the resultant data with the answer data 90f for scoring. When the answer contents data includes image data for OCR, the OCR processing application 90c performs data conversion, and the scoring application 90a collates the resultant data with the answer data 90f for scoring. When the answer contents data includes image data for image comparison/collation, the image comparison and collation processing application 90g performs data conversion, and the scoring application 90a collates the resultant data with the answer data 90f for scoring. When the answer contents data includes voice data, the voice recognition processing application 90d performs data conversion, and the scoring application 90a carries out scoring. The data relating to questions that are impossible for the scoring application 90a to evaluate and the data that cannot be converted by the OMR processing application 90b, the OCR processing application 90c, the image comparison and collation processing application 90g, and the voice recognition processing application 90d are manually scored by using the answer contents data reproducing application 90e. The results are sent to the scoring application 90a.

After the scoring goes through all the questions, the scoring application 90a creates scoring contents data (step S8). The scoring contents data to be created includes HTML data available for the examinees to browse by the WWW server application 70c, text data for the e-mail sever application 70d to distribute to the examinees in the form of e-mails, and print data from which the pass certificates of the examinations can be printed.

The scoring contents data created is transmitted to the WWW server application 70c and the e-mail server application 70d of the test management server 58 as appropriate, depending on the types of data (step S9).

The WWW server application 70c receives the scoring contents data, and stores it into data areas available for browsing by the examinees to publish the test results on Web pages. The e-mail server application 70d receives the scoring contents data and sends it to the e-mail addresses of the examinees as needed (step S9). Incidentally, the e-mail server application 70d retrieves and extracts the e-mail addresses of the examinees from the examinee database 70a as needed.

At step S10, the results of the scoring by the scoring application 90a are summarized and sorted to create/update an incorrect answer database (not shown) which has the same configuration as that of the no-answer database 90h. The scoring application 90a counts the numbers of incorrect answers to the respective questions. It also performs summarization by attribute data such as age, gender, address, occupation, job description, membership of institutions, examination class, and examination location. Consequently, test writers can consult the contents of the incorrect answer database and analyze the answering propensities to the questions, so that questions of too high or too low a difficulty level can be excluded to write appropriate questions for each examination class.

As has been described, according to the online examination system of various preferred embodiments of the present invention, it is possible to provide a scoring method and a scoring system which can perform scoring quickly and accurately, and summarize and sort the scores into statistic data readily.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A scoring system comprising:
answer data collecting means for collecting answer data relating to answers provided by a plurality of examinees of a test;
attribute data collecting means for collecting various attribute data of the examinees;
answer determination means for determining which of said answer data corresponds to one of a correct answer, an incorrect answer and no answer; and
summarizing and sorting means for summarizing and sorting said various attribute data of the examinees based upon results of the answer determination means; wherein
the answer determination means compares a data volume of the answer data corresponding to each question of the test to a minimum answer data volume in order to determine if no answer was provided to that question of the test.

2. The scoring system according to claim 1, wherein said various attribute data of the examinees includes at least one of age, gender, an occupation, an address, and membership of institutions.

3. The scoring system according to claim 1, wherein said answer data is character data.

4. The scoring system according to claim 1, wherein said answer data is image data, and is subjected to image recognition processing for scoring.

5. The scoring system according to claim 1, wherein:
said answer data is image data; and
for scoring, said image data is compared and collated with image data to be drawn under a correct answer.

6. The scoring system according to claim 5, wherein said image data includes information relating to a process for an answerer to provide an answer.

7. The scoring system according to claim 6, wherein said information relating to a process for an answerer to provide an answer is the order of strokes in writing a character or symbol.

8. The scoring system according to claim 6, wherein said information relating to a process for an answerer to provide an answer is tool pressure in writing a character or symbol.

9. The scoring system according to claim 1, wherein:
said answer data is voice data; and
a sound waveform of said voice data is compared to a sound waveform of a correct answer for scoring.

10. The scoring system according to claim 1, wherein:
the examinees provide answers by using computers; and
said answer data is answer contents data created by said computers.

11. A scoring method comprising the steps of:
collecting answer data relating to answers provided by a plurality of examinees of a test;

collecting various attribute data of the examinees;

encoding the answer data and the various attribute data on at least one computer readable medium;

determining which of said answer data corresponds to one of a correct answer, an incorrect answer and no answer; and summarizing said various attribute data of the examinees based upon results of the step of determining which of said answer data corresponds to one of a correct answer, an incorrect answer and no answer; wherein the step of determining which of said answer data corresponds to one of a correct answer, an incorrect answer and no answer includes the step of comparing a data volume of the answer data corresponding to each question of the test to a minimum answer data volume in order to determine if no answer was provided to that question of the test; and said answer data is image data, and is subjected to image recognition processing for scoring.

12. The scoring method according to claim 11, wherein said various attribute data of the examinees includes at least one of age, gender, an occupation, an address, and membership of institutions.

13. The scoring method according to claim 11, wherein said answer data is character data.

14. A scoring method comprising the steps of:

collecting answer data relating to answers provided by a plurality of examinees of a test;

collecting various attribute data of the examinees;

encoding the answer data and the various attribute data on at least one computer readable medium;

determining which of said answer data corresponds to one of a correct answer, an incorrect answer and no answer; and summarizing said various attribute data of the examinees based upon results of the step of determining which of said answer data corresponds to one of a correct answer, an incorrect answer and no answer; wherein the step of determining which of said answer data corresponds to one of a correct answer, an incorrect answer and no answer includes the step of comparing a data volume of the answer data corresponding to each question of the test to a minimum answer data volume in order to determine if no answer was provided to that question of the test;

said answer data is image data; and for scoring, said image data is compared and collated with image data to be drawn under a correct answer.

15. The scoring method according to claim 14, wherein said image data includes information relating to a process for an answerer to provide an answer.

16. The scoring method according to claim 15, wherein said information relating to a process for an answerer to provide an answer is the order of strokes in writing a character or symbol.

17. The scoring method according to claim 15, wherein said information relating to a process for an answerer to provide an answer is tool pressure in writing a character or symbol.

18. A scoring method comprising the steps of:

collecting answer data relating to answers provided by a plurality of examinees of a test;

collecting various attribute data of the examinees;

encoding the answer data and the various attribute data on at least one computer readable medium;

determining which of said answer data corresponds to one of a correct answer, an incorrect answer and no answer; and summarizing said various attribute data of the examinees based upon results of the step of determining which of said answer data corresponds to one of a correct answer, an incorrect answer and no answer; wherein the step of determining which of said answer data corresponds to one of a correct answer, an incorrect answer and no answer includes the step of comparing a data volume of the answer data corresponding to each question of the test to a minimum answer data volume in order to determine if no answer was provided to that question of the test;

said answer data is voice data; and a sound waveform of said voice data is compared to a sound waveform of a correct answer for scoring.

19. A scoring method comprising the steps of:

collecting answer data relating to answers provided by a plurality of examinees of a test;

collecting various attribute data of the examinees;

encoding the answer data and the various attribute data on at least one computer readable medium;

determining which of said answer data corresponds to one of a correct answer, an incorrect answer and no answer; and summarizing said various attribute data of the examinees based upon results of the step of determining which of said answer data corresponds to one of a correct answer, an incorrect answer and no answer; wherein the step of determining which of said answer data corresponds to one of a correct answer, an incorrect answer and no answer includes the step of comparing a data volume of the answer data corresponding to each question of the test to a minimum answer data volume in order to determine if no answer was provided to that question of the test;

the examinees provide answers by using computers; and said answer data is answer contents data created by said computers.

* * * * *